Patented Sept. 16, 1924.

1,508,448

UNITED STATES PATENT OFFICE.

WALTER GLAESER, OF BROOKLYN, NEW YORK.

METHOD OF MAKING GREEN SCALES.

No Drawing.  Application filed November 9, 1921. Serial No. 514,100.

*To all whom it may concern:*

Be it known that I, WALTER GLAESER, a citizen of the United States, and a resident of Brooklyn, county of Kings, and State of New York, have invented a new and useful Improvement in Methods of Making Green Scales, of which the following is a specification, the principle of the invention being herein explained and the best mode in which I have contemplated applying that principle, so as to distinguish it from other inventions.

The present invention relates to an improved method of making scale salts which are dried by brushing upon glass plates until the material peels off from the plates in the form of scales, which provides the name. Such salts are used for medicinal and technical purposes, being valuable in tonics, and as they are very sensitive to light they are widely used in blue printing. Such scales are now made by a complicated and expensive process which is not at all satisfactory, but which, nevertheless, is in general use, and is the only method known for making these products. For convenience and simplicity of description my improved process will be described as applied to the manufacture of green scales only, other scales being made, however, in a similar manner. To the accomplishment of the foregoing and related ends, said invention, then, consists of the means hereinafter fully described and particularly pointed out in the claim.

The following description sets forth in detail one approved method of carrying out the invention, such disclosed mode, constituting but one of the various ways in which the principle of the invention may be used.

My improved method consists in reacting upon calcium citrate of lime with ferric sulphate solution and then treating the resulting solution with ammonia or an ammonium salt which will give a precipitate with calcium, like ammonium sulphate solution or ammonium oxalate solution. If desired, however, ferric ammonium sulphate solution may be employed for the decomposition of calcium citrate. It is impossible to give a definite equation to represent the reactions which will take place for the reason that ferric ammonium citrate has no definite and exact formula. The reaction which takes place between the calcium citrate and the solution of ferric sulphate can be represented, however, by the following equation:—

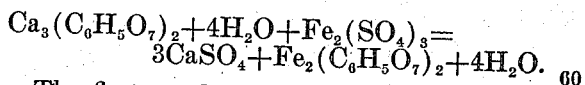

$$Ca_3(C_6H_5O_7)_2 + 4H_2O + Fe_2(SO_4)_3 = 3CaSO_4 + Fe_2(C_6H_5O_7)_2 + 4H_2O.$$

The first result of the above treatment is to precipitate calcium sulphate which may be removed from the solution by filtration. Ammonia or an ammonium salt is then added and any calcium sulphate which remains in the liquor may be removed after this treatment by further filtering. The liquor is next evaporated to a strength sufficient to produce green scales, after which the green scales may be prepared for use by being brushed onto glass plates and then dried until they peel off when they are removed from the plates. This method is very much simpler and less expensive than that commonly used in the making of scaling solutions. Any deficiency in the desired iron contents of the scale salt may be made up by the addition to the solution, before evaporation, of the necessary amount of freshly precipitated iron hydroxide.

Other modes of applying the principle of my invention may be employed instead of the one explained, change being made as regards the process herein disclosed, provided the step or steps stated by the following claim or the equivalent of such stated step or steps be employed.

I therefore particularly point out and distinctly claim as my invention:—

In a method of producing green scales, the steps which consist in treating calcium citrate with ferric sulphate solution and then removing the precipitate formed, then adding an ammonium salt removing further precipitate, evaporating the filtrate to a strength to produce green scales and brushing the same onto glass.

Signed by me, this 17th day of January, 1920.

WALTER GLAESER.